(12) United States Patent
Gedraitis

(10) Patent No.: US 11,409,094 B2
(45) Date of Patent: Aug. 9, 2022

(54) SYSTEM AND METHOD FOR TEMPLATE-BASED IMAGE ANALYSIS

(71) Applicant: Molecular Devices, LLC, San Jose, CA (US)

(72) Inventor: Paula Karen Gedraitis, Hopkinton, MA (US)

(73) Assignee: Molecular Devices, LLC, San Jose, CA (US)

( * ) Notice: Subject to any disclaimer, the term of this patent is extended or adjusted under 35 U.S.C. 154(b) by 587 days.

(21) Appl. No.: 16/328,358

(22) PCT Filed: Aug. 24, 2017

(86) PCT No.: PCT/US2017/048426
§ 371 (c)(1),
(2) Date: Feb. 26, 2019

(87) PCT Pub. No.: WO2018/044683
PCT Pub. Date: Mar. 8, 2018

(65) Prior Publication Data
US 2021/0278654 A1 Sep. 9, 2021

Related U.S. Application Data

(60) Provisional application No. 62/381,974, filed on Aug. 31, 2016.

(51) Int. Cl.
*G02B 21/36* (2006.01)
*G06T 7/73* (2017.01)
*G06T 7/11* (2017.01)

(52) U.S. Cl.
CPC .............. *G02B 21/367* (2013.01); *G06T 7/11* (2017.01); *G06T 7/74* (2017.01); *G06T 2207/10056* (2013.01)

(58) Field of Classification Search
CPC ........ H01L 21/00; B23K 26/00; G01N 21/25; G01N 35/00; G06K 9/32; G02B 21/367; G06T 7/74; G06T 2207/10056
See application file for complete search history.

(56) References Cited

U.S. PATENT DOCUMENTS 8,644,581 B2 * 2/2014 Ramirez ............ G06K 9/00127
382/133
2003/0103662 A1 6/2003 Finkbeiner
(Continued)

FOREIGN PATENT DOCUMENTS

| EP | 2796917 A1 | 10/2014 |
|---|---|---|
| WO | 2009126495 A2 | 10/2009 |
| WO | 2016123300 A1 | 8/2016 |

OTHER PUBLICATIONS

International Search Report and Written Opinion for PCT/US2017/048426 dated Jan. 2, 2018.
(Continued)

*Primary Examiner* — Nancy Bitar
(74) *Attorney, Agent, or Firm* — McCracken & Gillen LLC

(57) ABSTRACT

A template-based image analysis system and method are disclosed. A slide is loaded in a high-content image system (HCIS), wherein the slide includes a plurality of reference marks and a plurality of sample locations. An acquired images data store has previously acquired images stored therein. An image acquisition module acquires an image of the slide from the high-content imaging system. A feature identification module develops a binary image of the acquired image, wherein the binary image identifies areas associated with reference marks. A template generation module generates a template in accordance with the previously acquired images and a template alignment module aligns the generate template with the binary image. An offset
(Continued)

calculation module determines an offset between the template and the binary image and an image segmentation module determines the coordinates of pixels of the acquired image that are associated with the sample locations in accordance with the calculated offset.

16 Claims, 7 Drawing Sheets

(56) References Cited

U.S. PATENT DOCUMENTS

| | | |
|---|---|---|
| 2007/0031993 A1 | 2/2007 | Nemets et al. |
| 2008/0144899 A1* | 6/2008 | Varma .................... G06K 9/522 382/129 |
| 2015/0078629 A1* | 3/2015 | Gottemukkula ........ G06T 11/60 382/117 |
| 2015/0278625 A1* | 10/2015 | Finkbeiner ............. G02B 27/32 348/79 |
| 2018/0081376 A1* | 3/2018 | Zhang ....................... G05D 3/12 |
| 2019/0114464 A1* | 4/2019 | Nicolle .................. G16B 30/10 |

OTHER PUBLICATIONS

International Preliminary Report on Patentability for Application No. PCT/US2017/048426, dated Mar. 14, 2019 (9 pages).
Extended European Search Report for European Application No. EP 17847247, dated Jan. 24, 2020 (8 pages).
Yang et al., Comparison of Methods for Image Analysis on cDNA Microarray Data, Journal of Computational and Graphical Statistics, Mar. 1, 2002, pp. 108-136, vol. 11, US (30 pages).
Original and translated Notice of Reasons for Refusal for Japanese Patent Application JP 2019-531545, dated Aug. 16, 2021 (6 pages).
English translation of abstract for Image processing device, image laboratory, vol. 25, No. 7 Image Laboratory, Japan, Nihon Kogyo Publishing Co., Ltd., 2014, vol. 25, pp. 40-46, Ijiri Zenku (1 page).

* cited by examiner

SYSTEM AND METHOD FOR TEMPLATE-BASED IMAGE ANALYSIS

RELATED APPLICATION

This application claims priority to U.S. Provisional Application No. 62/381974 filed on Aug. 31, 2016, the content of which is incorporated herein by reference in its entirety.

FIELD OF DISCLOSURE

The present subject matter relates to high-content imaging systems and more particularly, to a system and method to use a template to align images captured by such systems.

BACKGROUND

A high-content imaging system (HCIS) may be used to obtain a microscopy image of a biological sample such as DNA, proteins, cells, and the like. A plurality of such biological samples may be disposed on a slide. Such biological samples may be disposed on the slide in a two-dimensional array pattern, wherein the distance between adjacent locations where biological samples may be deposited is predetermined. However, the location and rotation of the aggregate array may vary from slide to slide.

The slide on which the array of biological samples is disposed may be prepared by printing indicia thereon that serve as fiducial or reference marks. The array of biological samples is then deposited on the slide relative to such indicia. The position of each biological sample may be located relative to such fiducial or reference marks. However, it may be difficult to identify one or more reference mark(s) in an image of the slide on which the mark is disposed. Such difficulty may arise because of, for example, a lack of contrast between the reference mark and the slide material, defects in the printing process that disposed the reference mark on the slide, and/or too large a distance between the reference mark and the array to fit in the field of view of the HCIS.

SUMMARY

A template-based system to analyze an image includes a high-content imaging system (HCIS) and a slide loaded in the HCIS. The slide includes a plurality of reference marks and a plurality of sample locations. The template-based system also includes an acquired images data store having previously acquired images stored therein, an image acquisition module, a feature identification module, a template generation module, a template alignment module, an offset calculation module, and an image segmentation module. The image acquisition module acquires an image of the slide from the high-content imaging system, and the feature identification module develops a binary image of the acquired image, wherein the binary image identifies areas associated with reference mark. The template generation module generates a template in accordance with the previously acquired images, the template alignment module aligns the generated template with the binary image, and the offset calculation module determines an offset between the template and the binary image. The image segmentation module determines the coordinates of pixels of the acquired image that are associated with the sample locations in accordance with the calculated offset.

A template-based method for analyzing an image includes disposing reference marks and a plurality of samples on a slide and loading the slide in a high-content imaging system (HCIS). The positions of each the plurality of samples is in accordance with the positions of the reference marks. The method also includes storing previously acquired images in an acquired images data store, acquiring with the HCIS an image of the slide loaded in the HCIS, and developing a binary image of the acquired image. The binary image identifies areas associated with reference marks. The method includes the additional steps of generating a template in accordance with the previously acquired images, aligning the template with the binary image, and calculating an offset between the template and the binary image. The method includes the further step of determining the coordinates of pixels of the acquired image that are associated with the sample locations in accordance with calculated offset.

Other aspects and advantages will become apparent upon consideration of the following detailed description and the attached drawings wherein like numerals designate like structures throughout the specification.

DETAILED DESCRIPTION

Figure 1:
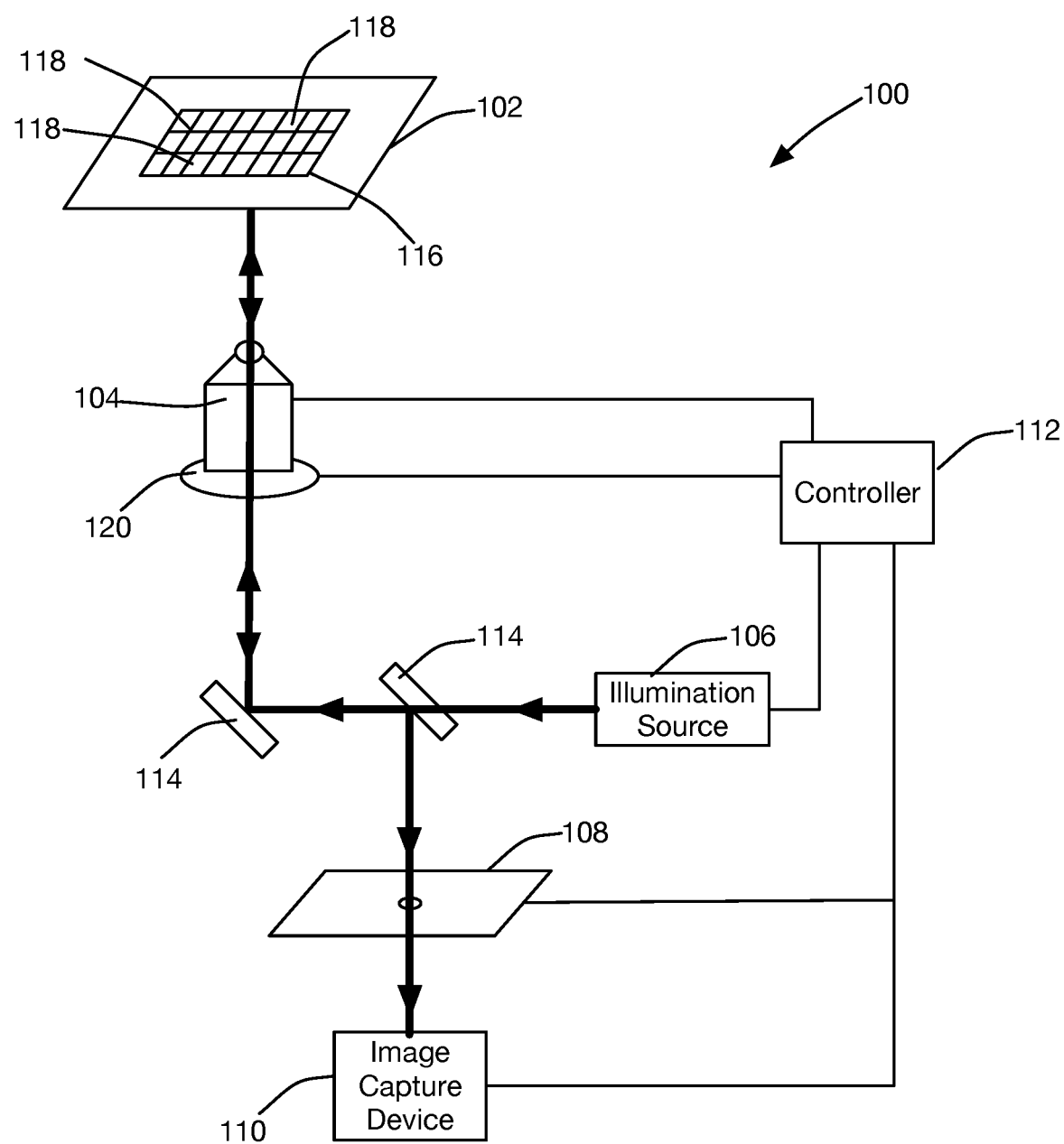
FIG. 1 is a block diagram of a high-content imaging system (HCIS) in accordance with the present invention.

Referring to FIG. 1, as will be apparent to those who have skill in the art, an HCIS 100 may include an X-Y stage 102, one or more objective lenses 104, one or more illumination sources 106, one or more filters 108, an image capture device 110, and a controller 112. The HCIS 100 may also include one or more mirrors 114 that direct light from the illumination source 106 to a slide 116 that may be disposed on the X-Y stage 102, and from such slide 116 to the image capture device 110. Typically, the slide 116 includes evenly spaced locations 118, and samples (for example, biological cells) to be imaged by the HCIS 100 may be disposed at each such location 118.

Although, FIG. 1 shows the light from the illumination source 106 reflected from slide 116 reaching the image capture device 110, it should be apparent that additional mirrors (not shown) may be used so that light from the illumination source 106 is transmitted through the slide 116 and directed toward the image capture device 110. Further, it should be apparent that in some cases no illumination from the illumination source 106 may be necessary to image the samples in the slide 116 (for example, if the samples emit light or if the samples include radioactive components). In some embodiments, light from the illumination source may be transmitted through the samples in the slide 116, and the samples refract and/or absorb the transmitted light to produce light that is imaged.

During operation, the slide 116 may be placed, either manually or robotically, on the X-Y stage 102. In addition, the controller 112 may configure the HCIS 100 to use a combination of a particular objective lens 104, illumination generated by the illumination source 106, and/or filter 108. For example, the controller 112 may operate a positioning device 120 to place a selected objective lens 104 and, optionally, a selected filter 108 in the light path between the slide 116 and the image capture device 110. Such position device 120 may include one or more motors coupled to the objective lens 102, the selected filter 108, and/or the image capture device 110. The controller 112 may also direct the illumination source 106 to illuminate the slide 116 with particular wavelengths of light. The samples in the slide 116 may contain molecules that fluoresce, either naturally occurring molecules, or molecules produced or present within the samples due to treatment. The wavelength illuminating the sample may be the excitation wavelengths associated with such fluorescent molecules, and the imaging capture device will capture only the emission spectrum of such fluorescent materials. One or more wavelengths may used serially or simultaneously to illuminate the same samples and produce images Referring to FIG. 2, a slide 116 includes evenly spaced locations 118 at which samples may be disposed. The locations 118 are arranged in a two-dimensional array 120, having a predetermined number of horizontal and vertical locations 118, and the distance between adjacent pairs of the locations 118 being substantially identical. The slide 116 also includes reference marks 152 and 154. Some reference marks 152 are disposed on the slide to be coincident with a particular location 118 of the array 120.

Other reference marks 154 are placed outside the bounds of the array 120 at predetermined horizontal and vertical distances 156 and 158, respectively, from a particular location 160 associated with the array 120. Although in FIG. 2 the horizontal and vertical distances 156 and 158, respectively, are measured from the centers of the reference marks 154, it should be apparent that such distances 156 and 158 may be measured from any other portion of the reference mark 152. Further, the horizontal and vertical distances 156 and 158 associated with a particular reference mark 154 need not be identical to the horizontal and vertical distances associated with a different reference mark. For example, the horizontal distance 156a associated with the reference mark 154a need not be identical to one or both of the horizontal distances 156b and 156c associated with the reference marks 154b and 154c, respectively. Similarly, the vertical distance 158a associated with the reference mark 154a need not be identical to one or both of the vertical distances 158b and 158c associated with the reference marks 154b and 154c, respectively.

The array 150 may be rotated relative to the slide 116. In such cases, the horizontal and vertical distances 154 and 156, respectively, are measured relative to the horizontal and vertical axes of the array 150.

Although the reference marks 152 and 154 are depicted as circular, it should be apparent that these reference marks 152 and 154 may have any predetermined shape. Further, all of the reference marks 152 and 154 disposed on the slide 116 do not have to have identical shapes and/or sizes. The reference marks 152 and 154 may be disposed on slide 116 by being imprinted on, attached to, raised from, or etched into the slide 116. Further, all of the reference marks 152 and 154 disposed on the slide 116 may be disposed using different techniques. For example, some reference marks 152 and 154 may be printed and others may be etched.

It should be apparent that in an image of the slide 116, if the coordinates of a pixel in such image of one of the reference mark 152 and 154 can be determined, then the coordinates of pixel of the location 160 associated with the array 150 may be calculated therefrom. The pixel coordinates of additional reference marks 152 and 154 may improve the accuracy with which the pixel coordinates of the location 160 is calculated. Coordinates of the pixel associated with a reference point 152, 154 may be the coordinates of a pixel associated with a center of such reference mark or the coordinates of any other predetermined feature of such reference mark.

Further, after the coordinates of the pixel associated with the location 160 are determined, the coordinates of the pixels in the image of the slide 116 associated with all of the locations 118 may also be determined.

Figure 2:
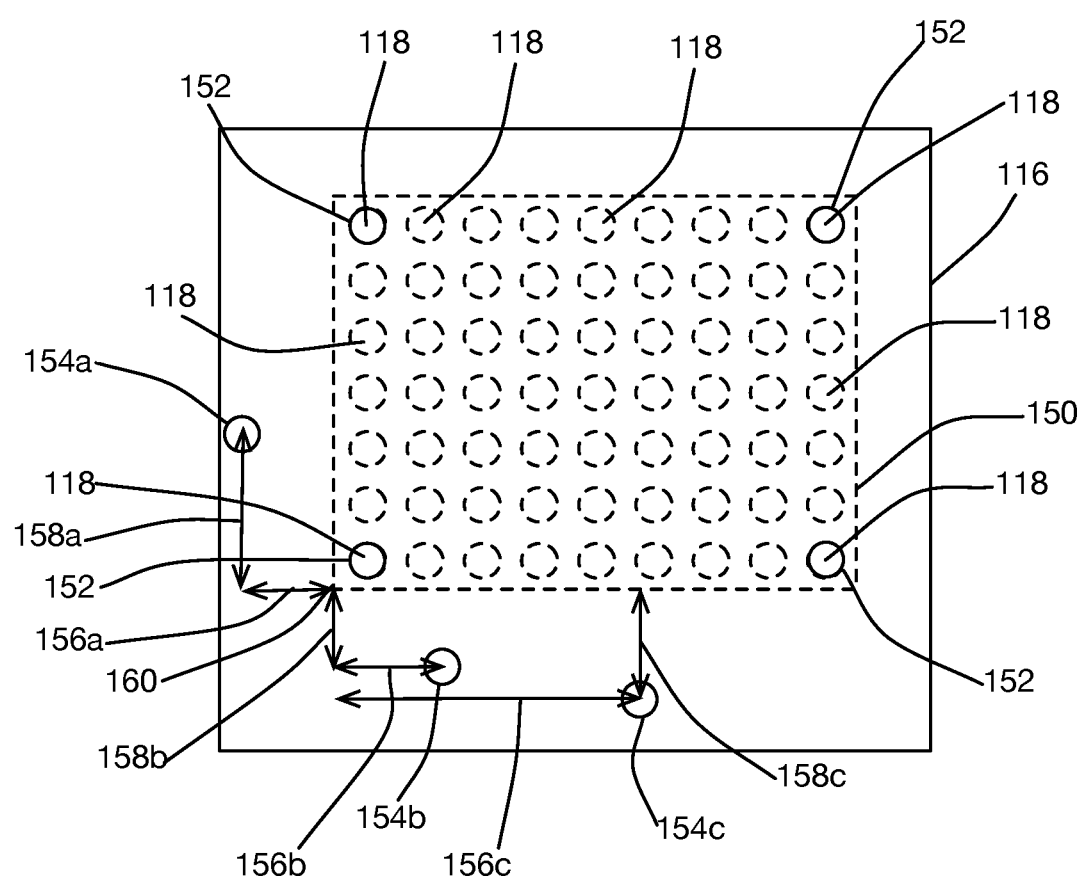
FIG. 2 is a top plan view of a slide that may be imaged using the HCIS of FIG. 1.
Figure 3A:
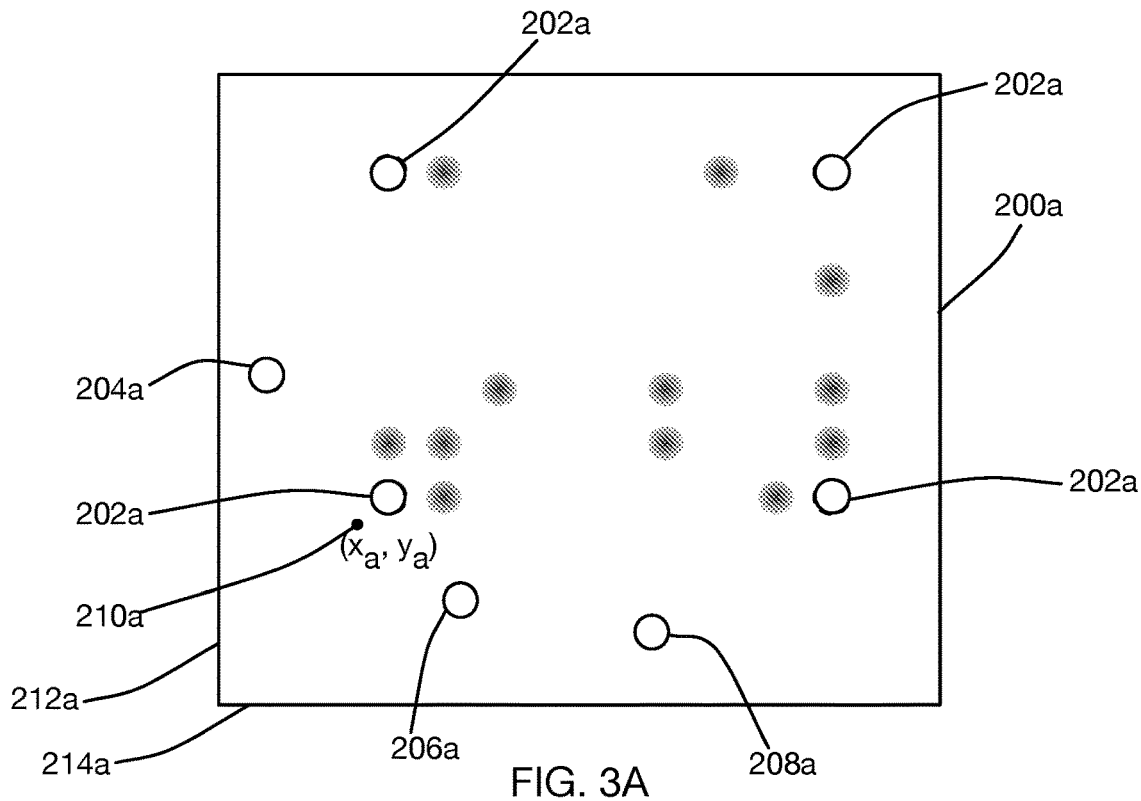
FIGS. 3A-3C illustrate images of slides developed using the HCIS of FIG. 1.
Figure 3B:
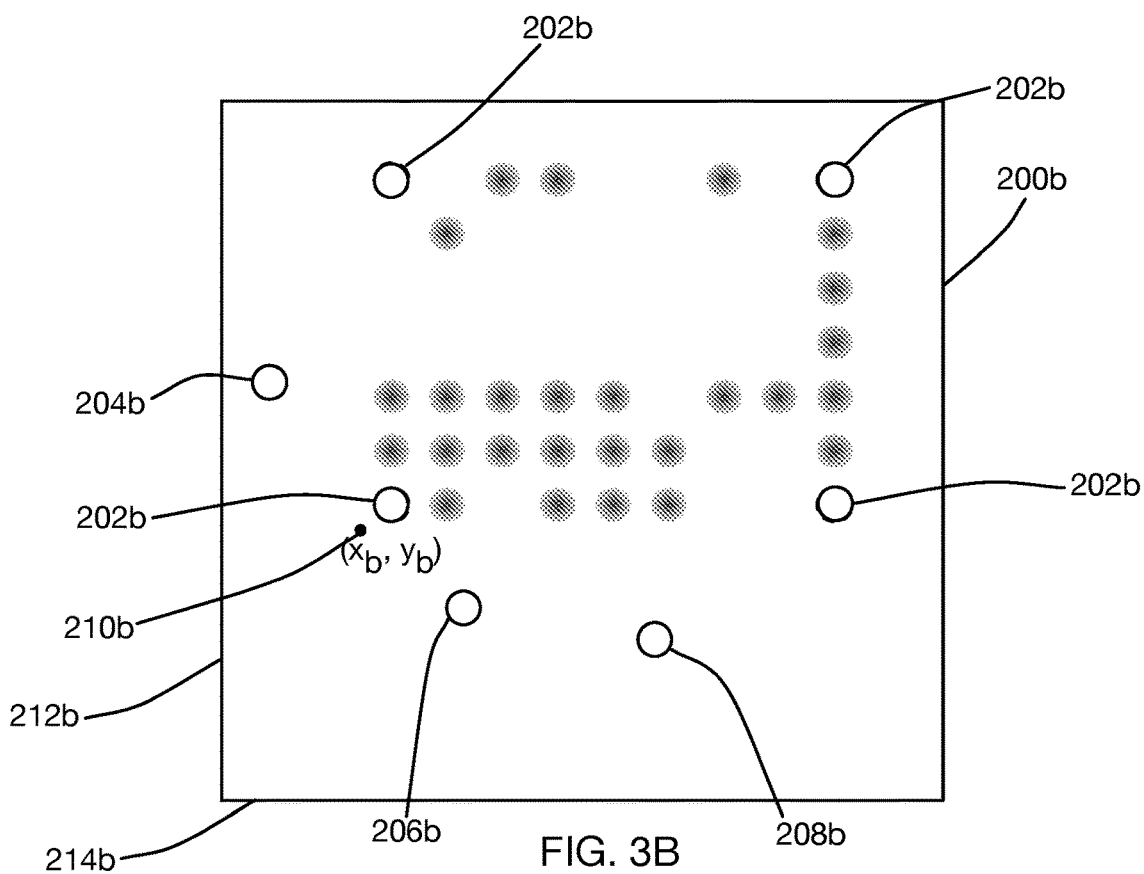
Figure 3C:
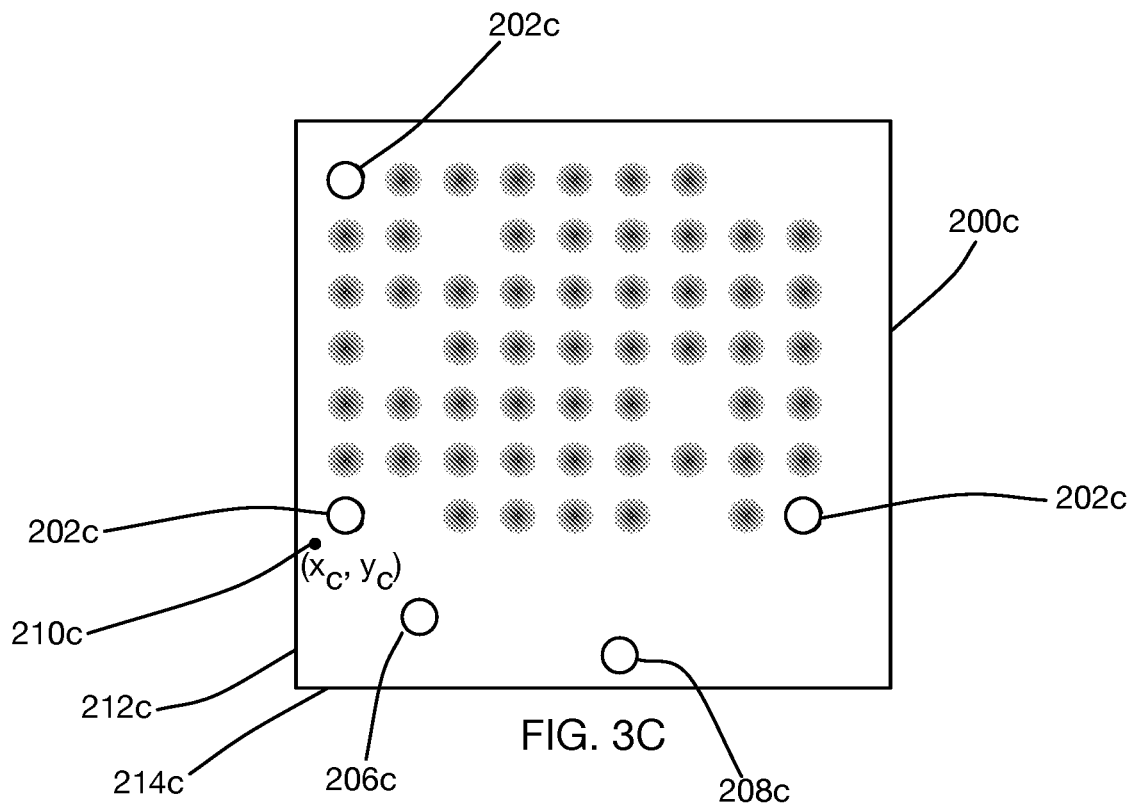

FIGS. 3A-3C depict images 200a, 200b, and 200c of three different slides, each slide includes an array of sample locations and reference marks positioned relative to one another identically to the slide 116 shown in FIG. 2. As should be apparent, the images 200a, 200b, and 200c show biological samples having been deposited in only some of the sample locations of each slide.

The image 200a includes pixels 202a that identify all of the reference marks 152, and pixels 204a, 206a, and 208a that identify the reference marks 154a, 154b, and 154c, respectively, of the slide from which this image was created. Similarly, the image 200b includes pixels 202b that identify the reference marks 152, and pixels 204b, 206b, and 208b that identify the reference marks 154a, 154b, and 154c, respectively of the slide from which this image was created. However, the image 200a includes pixels 202a that identify only three of the reference marks 152 (with no pixels that show the reference mark 152 at the top-right of the array 118), and only pixels 206c and 208c that identify the reference marks 154b and 154c of the slide from which this image was made.

Each of the images 3A-3C include pixels 210a, 210b, and 210c associated with the location of point 160 in the slides from which the images 200a, 200b, and 200c, respectively, were created. Note, the pixels 210a, 210b, and 210c may be indistinguishable from the backgrounds of the images 200a, 200b, and 200c, respectively. However, once the coordinates of the pixels 210a, 210b, and 210c are determined, the coordinates of the pixels in the images 200a, 200b, and 200c, respectively, associated with the sample locations 118 in the slides associated with these images can also be determined.

Figure 4:
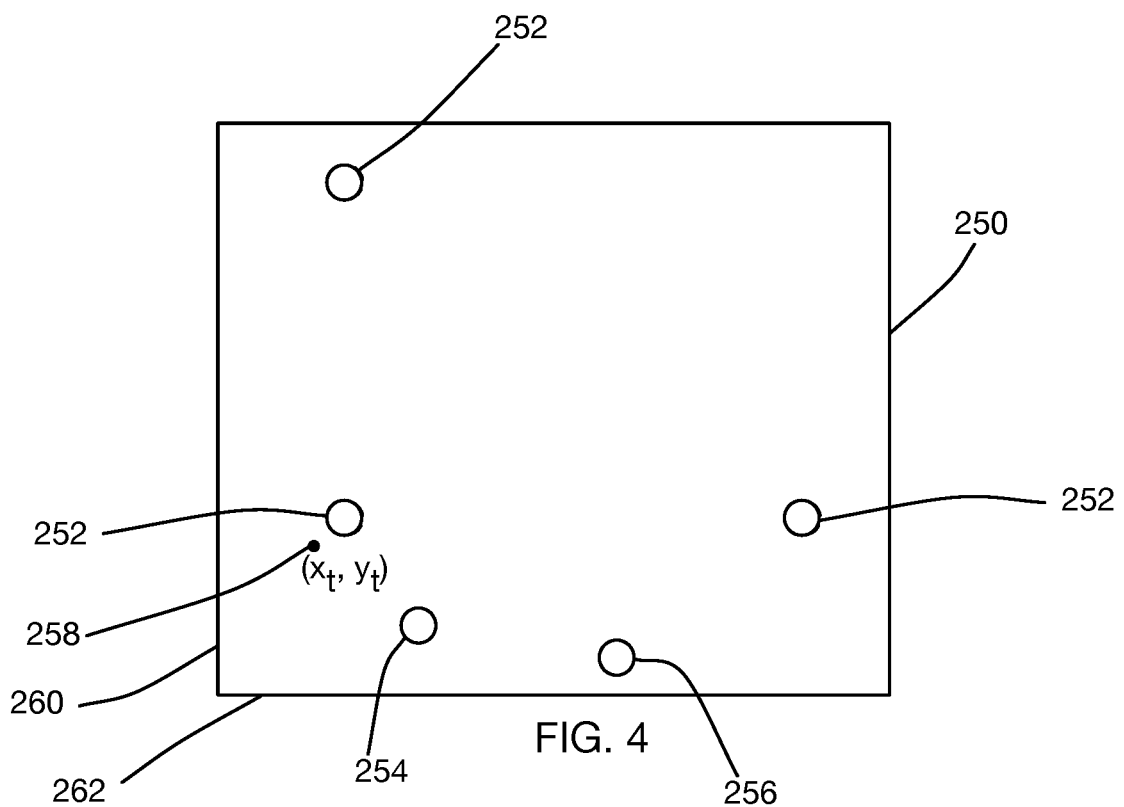
FIG. 4 illustrates a template developed from the images of FIGS. 3A-3C.

Referring to FIG. 4, to facilitate accurate identification of the coordinates of the pixels 210a, 210b, and 210c, a template image 250 is created from the images 200a, 200b, and 200c. The template image 250 shows the common features of the images 200a, 200b, and 200c used generate the template image. The template image 250 includes features common to all of the images 200 that were used to create the template image 250. Such common features may include portions of the image associated with reference marks 152 on the slide 116 used to create the images 200, but also any other image elements. Such image elements may include, for example, samples deposited in one or more locations 118 of the slide 116 that appear in all of the images.

The pixels 252 of the template image 250 that are associated reference marks 152 that appeared in all of the images 200a, 200b, and 200c to a predetermined non-background intensity value. In addition, pixels 254 and pixels 256 associated with the reference marks 154b and 154c, respectively, are also set to non-background intensity value because these references marks appeared in all of the images 200a, 200b, and 200c. The pixels at coordinates corresponding to the locations of those reference marks, for example, the top-right reference mark 152 and the reference mark 154a, that were not shown in all of the images 200c are set to the background intensity value.

To create the template image, reference marks are identified in each image 200a, 200b, and 200c using image segmentation and image feature identification techniques. A threshold is applied to each image 200 to set the intensity value of any pixel of the image that has an intensity below that expected for a reference mark to a background intensity value. In some embodiments, the intensity value of any pixel of the image that has an intensity value above that expected for a reference mark is set to a background intensity value. Thereafter, each adjacent group of pixels in the image 200 that have non-background intensity values is analyzed. If the number of such pixels that comprise the group, or if the dimensions and/or shape of the group is different that what would be expected for a reference mark, then the intensity value of the pixels that comprise the group are set to the background intensity. Otherwise, the intensity value of the group of pixels is set to the non-background intensity. The result is a binary image associated with each image 200a, 200b, and 200c, and each such binary image includes pixels that have non-background intensity values and that are associated with candidate reference marks. The pixels associated with candidate reference marks in the binary images created from the images 200a, 200b, and 200c are analyzed across the binary images create the template image 250.

In some embodiments, edge detection techniques apparent to those who have skill in the art may be used to identify substantially contiguous boundaries of image features in the binary image. The pixels bounded by such contiguous boundaries may be set to the non-background intensity and the shape and/or dimensions of such pixels may analyzed as described in the foregoing to determine if such pixels are associated with reference marks.

A template image 252 is created from the binary images developed from the different images 200. All of the pixels of the template image 252 are initially set to a background intensity value. Thereafter, the binary images are registered with one another and each corresponding group of pixels having a non-background intensity values and that is present in all of the binary images and is coincident after registration is identified. The intensity values of the pixels in the template image 252 corresponding to the pixels of such identified group of pixels are set to the non-background intensity value.

The template image 250 developed as described above is then to identify the registration marks in the images 200 as well as other images captured by the HCIS 100 from additional slides 116 that have an identical relationship between one or more of the reference marks 152 and the array 150 of sample locations 118.

In particular, the template image 250 is aligned with the binary image created from the image 200a so that the non-background pixels 252, 254, and 256 of the template image are in register with corresponding non-background pixels of the binary image. The number of pixels ($x_{offset}$) that template image 250 must be shifted horizontally and the number of pixels ($y_{offset}$) that the template image 250 must be shifted vertically for the two images to be aligned may then be determined. Such offsets ($x_{offset}$, $y_{offset}$) may be added to the coordinates ($x_t$, $y_t$) of the pixel 258 (FIG. 4) to determine the coordinates of ($x_a$, $y_a$) of the pixel 210a (FIG. 3A) relative to the left and bottom boundaries 212a and 214a, respectively, of the image 200a.

Referring to FIGS. 1, 2 and 3A, as noted above, the position of the array 150, and thereby the position of each of the locations 118 where samples may be deposited may be determined from the location 160. It should be apparent, that once the coordinates of the pixel 210a of the image 200a is determined as described above, the locations of the pixels in the image 200a that are associated with each of the locations 118 may also be determined. Sub-images of the image 200a that are associated with the each location 118 may be analyzed to determine the features of biological samples deposited in such location 118. Such sub-images may also be displayed to a user for visual analysis or transmitted to another system (not shown) for further analysis.

In some embodiments, the image 200a may be acquired using at a low resolution. The offsets ($x_{offset}$, $y_{offset}$) of the pixel 210a in the image 200a may be calculated as described above and provided to the controller 112. The controller 112 scales the offsets in accordance with a target, higher resolution at which the slide will be reimaged, calculates the positions on the slide of the sample locations 118, and operates the position device 120 in accordance with the calculated positions to scan at the higher resolution each location 118 of the slide.

Referring to FIGS. 3A-3C, and 4, the coordinates ($x_b$, $y_b$) of the pixel 210b and ($x^c$, $y_c$) of the pixel 210c may be calculated in a manner similar to that described above to calculate the coordinates ($x_a$, $y_a$).

It should be apparent that one or more of the images 200a, 200b, and 200c may include an image of an array 118 that is rotated relative to the others. In these situations, when the template image 250 is brought into register, with the image 200a, 200b, or 200c, an angle of rotation in addition to a positional offset may be determined. One or more image analysis techniques apparent to those who have skill may be used to determine such angle of rotation including cross-correlation, frequency analysis, and searching through various angles of rotation.

Figure 5:
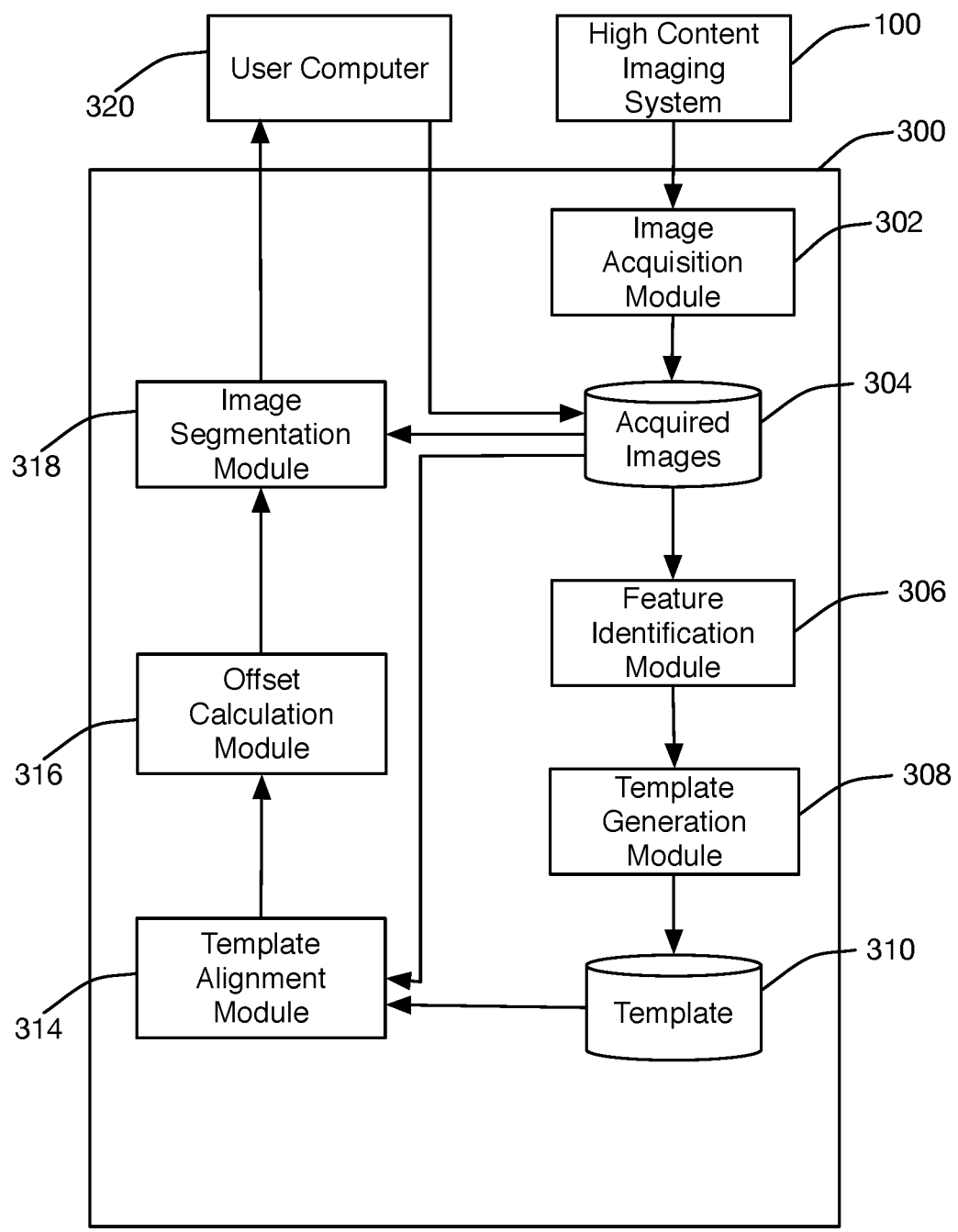
FIG. 5 is a block diagram of a template-based analysis system that may be used to analyze images captured by the HCIS of FIG. 1.

Referring to FIG. 5, a template-based image analysis system 300 that uses templates to analyze images from an HCIS 300 includes an image acquisition module 302 coupled to the HCIS 100. The image acquisition module 302 uses the HCIS 100 to obtain images of a plurality of slides 116 loaded in the HCIS 100 and stores such image in an acquired image data store 304. Each one of the plurality of slides each has an array 150 of sample locations 118 distributed in a two-dimensional array pattern thereon. A feature identification module 306 analyzes each acquired image to generate a binary image. The feature identification module 306 sets the intensity value of pixels of the binary image that are expected to be associated with reference marks on the slide 116 are set to a non-background intensity value as described above. The feature identification module 306 stores the binary image in the acquired images data store 304 and provides the binary image to a template generation module 308.

A template generation module 308 analyzes the binary images generated from the images of the plurality of slides and identifies pixels associated with reference marks that are common to all of binary images. The template generation module 308 thereafter generates a template image in which only those pixels associated with such common reference marks have a non-background intensity value. The remaining pixels have a background intensity value. The template generation module 308 stores the template in a template data store 310.

A template alignment module 312 retrieves from the image data store 304 an image to be analyzed and the binary image generated therefrom, and from the template data store 310 a template associated with the image to be analyzed. The template alignment module 314 then aligns the pixels of the template image with the retrieved binary image so that corresponding pixels associated with reference marks in each image overlap. An offset calculation module 316 develops a horizontal and vertical offsets and rotation of the array 150 represented in the image relative to the boundaries of the image. An image segmentation module 318 uses these offsets to segment the image to be analyzed into sub-images, wherein each sub-image is associated with a location 118 on the slide 116 where a sample may be deposited. A user may operate a user computer 320 to select and further analyze these sub-images. In addition, such sub-images may be transmitted to a further system for analysis. In some embodiments, the analyzed image, and the pixel coordinate information about such sub-images may be transmitted to a further system, and the further system may use such pixel coordinate information to extract a sub-image from the analyzed image. Such pixel coordinate information for each sub-image may comprise, for example, the pixel coordinate of opposite corners of a rectangular region of the analyzed image where the sub-image is located.

Figure 6:
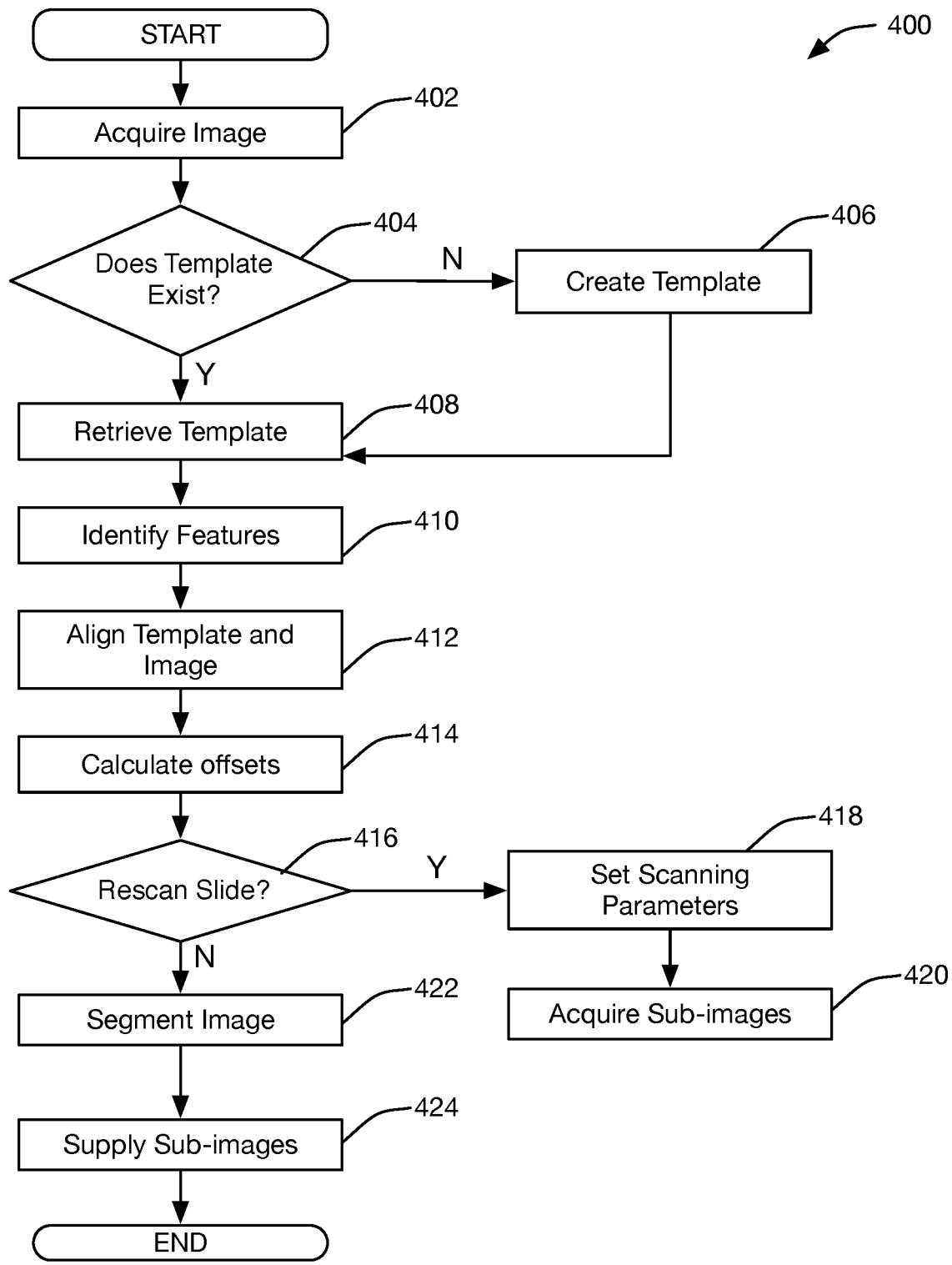
FIG. 6 is a flowchart of processing undertaken by the template-based analysis system of FIG. 5 to analyze an image.

FIG. 6 shows a flowchart 400 of the steps undertaken by an embodiment of a template-based image analysis system to analyze images. Referring to FIGS. 1, 5 and 6, at step 402, the image acquisition module 302 acquires an image of a slide 116 using the HCIS 100 and stores such image in the acquired images data store 304. Thereafter, at step 404 the template-based image analysis system 300 determines if a template already exists to analyze the acquired image. For example, the template-based image analysis system 300 may query the user via the user computer 320 to identify a previously created template stored in the template data store 310, for example, by presenting a list of such stored templates and asking the user to select a template from the list. Alternately, the template-based image analysis system 300 may query the user to select or enter an identifier associated with the scanned slide for which a template has already been created and stored in the template data store 310. The template-based image analysis system 300 may then identify a template from the template data store 310 in accordance with such identifier. If, at step 404, the user indicates that the template does not exist, processing proceeds to step 406, otherwise processing proceeds to step 408.

At step 406, the template-based image analysis system 300 develops a template that may be used to analyze the image acquired at step 402 and stores the developed template in the template data store 310. Thereafter, processing proceeds to step 408.

At step 408, the template-based image analysis system 300 retrieves the template from the template data store 310.

At step 410, the feature identification module 306 analyzes the acquired image to develop a binary image that identifies pixels of the acquired image that are expected to be associated with reference marks. The feature identification module 306 stores such binary image in the acquired images database 304.

At step 412, the template generation module 314 aligns the pixels associated with reference marks in the selected template with pixels associated with corresponding references marks in the binary image created by the feature identification module 306.

At step 414, the offset calculation module 316 determines the offset and rotation that were necessary to align the template with the binary image at step 412.

At step 416, the template-based image analysis system 300 queries the user via the user computer 320 whether the sample locations 118 of the slide 116 should be rescanned at high resolution. If the user requests rescanning, the image acquisition module 302, at step 418, uses the calculated offsets to determine position information associated with the sample locations 118 on the slide 116 and, at step 420, directs the controller 112 to position the positioning device 120 in accordance with such positioning information and operate the camera 104 to acquire a high resolution sub-image of the slide 116 in accordance with each such location 118. The image acquisition module 302, also at step 420, stores these sub-images in the image acquired images database 302.

If, at step 416, the user indicates that the slide 116 does not need to be scanned, the image segmentation module 318, at step 422, uses the calculated offsets to determine the coordinates in the acquired image of pixels associated with each sample location 118 of the slide 116. At step 424, the template-based image analysis system 300 supplies the position information or scanned sub-images to the user computer or to another system for further analysis.

Figure 7:
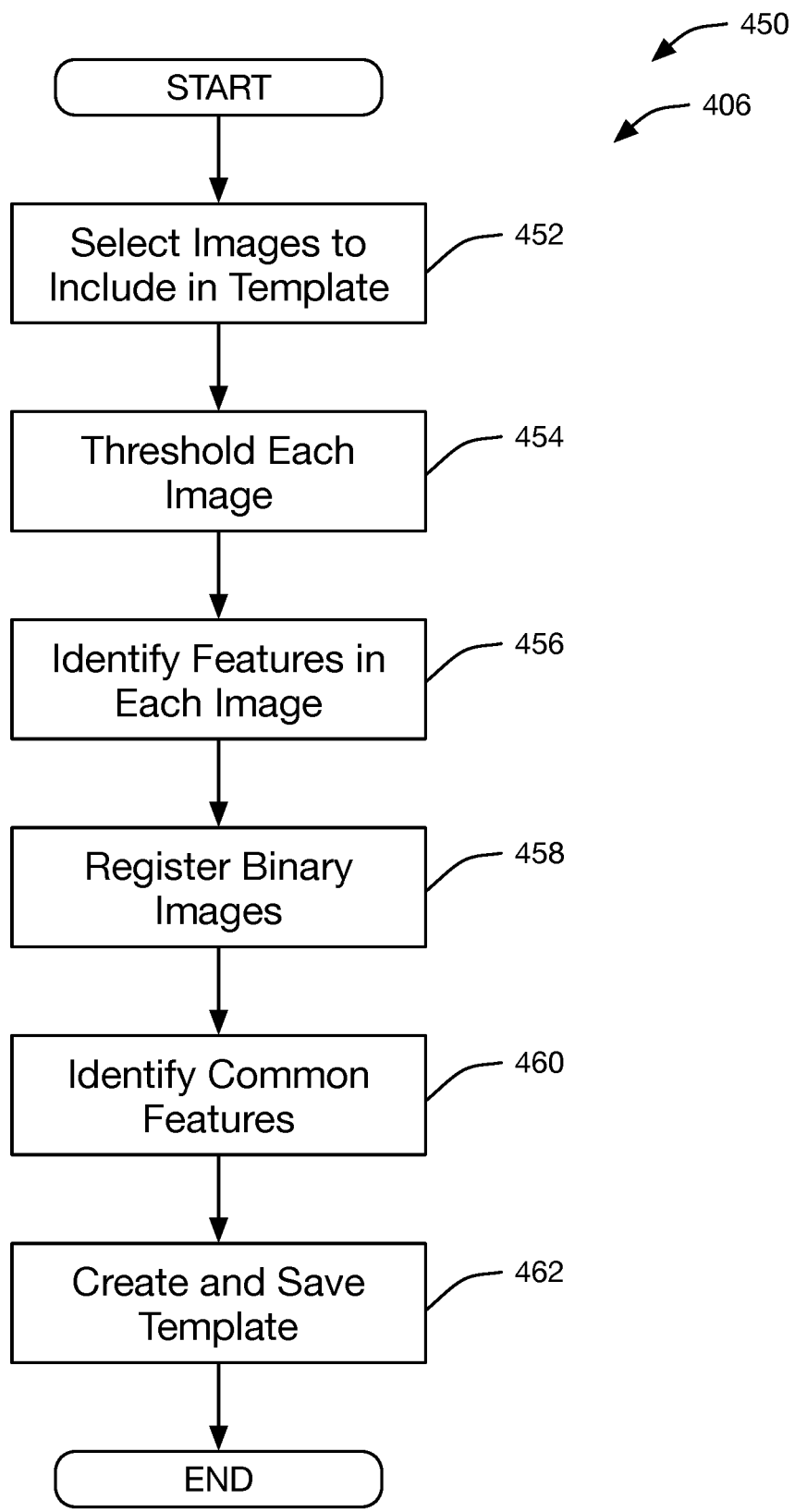
FIG. 7 is a flowchart of processing undertaken by the template-based analysis system of FIG. 5 to develop a template.

FIG. 7 shows a flowchart 450 of the steps undertaken by an embodiment of the template-based image analysis system 300 at step 406 (FIG. 4) to generate a template. Referring to FIGS. 5-7, at step 452, the template-based image analysis system 300 asks the user via the user computer 320 to identify previously acquired images in the acquired images data store 304 that should be used to develop the template. The user may be asked to select one or more acquired images from a list of the images available. Alternately, the user may enter or select an identifier associated with the slide 116 from which with the image was acquired at step 402, and the system 300 selects all images associated with such identifier from the acquired images data store 304.

At step 454, the feature identification module 306 applies a threshold to each selected image to generate a binary image corresponding thereto. At step 456, the feature identification module 306 analyzes each binary image to identify pixels in such image that correspond to reference marks. The feature identification module, also at step 456, sets such identified pixels to a non-background intensity value and sets all other pixels to a background intensity value.

At step 458, the template generation module 308 registers all of the binary images as describe above and, at step 460, identifies pixels that are associated with features that are common to all of the binary images. At step 462, the template generation module creates a template image in which pixels corresponding to pixels of the binary images associated with features common to all of the binary images are set to a non-background intensity value and the remaining pixels are set to the background intensity value. Also, at step 462, the template generation module 308 stores the template image in the template data store 310.

It should be apparent to those who have skill in the art that any combination of hardware and/or software may be used to implement the template-based image analysis described herein. It will be understood and appreciated that one or more of the processes, sub-processes, and process steps described in connection with FIGS. 1-7 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1-7. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the image acquisition module 302, the feature identification module 306, the template generation module 308, the template alignment module 314, offset calculation module 316, and the image segmentation module 318 of FIG. 5), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. A template-based image analysis system, comprising:
   an image acquisition module that receives from a high-content imaging system (HCS) an image of a slide loaded in the HCIS, wherein the received image includes areas associated with reference marks and areas associated with sample locations;
   an acquired images data store having stored therein a plurality of previously acquired images, wherein each of the plurality of previously acquired images is an image of one of a plurality of slides other than the slide represented in the received image;
   a feature identification module that develops a binary image from the received image and identifies a first area of the binary image expected to be associated with one of the reference marks;
   a template generation module that determines a feature that is common to the plurality of slides and represented in each of the plurality of previously acquired images and generates a template image in accordance with the previously acquired images, wherein the template image identifies a second area of the template image that is associated with the feature;
   wherein the feature comprises a plurality of features and the template generation module identifies the plurality of features common to the binary images of the plurality of previously acquired images to generate the template image and sets pixels in the template image associated with the plurality of features to a non-background intensity value and sets pixels of the template image not associated with the identified features to a background intensity value, a template alignment module that aligns the first area of the binary image and the second area of the template image;

an offset calculation module that determines an offset between the binary image and the template image in accordance with the alignment of the first area and the second area; and an image segmentation module that determines the coordinates of pixels of the received image that are associated with a sample location of the slide represented in the received image in accordance with the calculated offset.

2. The system of claim 1, wherein the image acquisition module directs the HCIS to position a positioning device in accordance with the coordinates, and directs the HCIS to acquire an image of the sample location associated with the coordinates.

3. The system of claim 1, wherein the image segmentation module develops sub-images of the received image in accordance with coordinates.

4. The system of claim 1, wherein the generated template image is a binary image.

5. The system of claim 1, wherein the template generation module associates the second area with the feature only if the feature is also represented in the received image.

6. The system of claim 1, wherein the feature identification module develops a binary image associated with each of the plurality of previously acquired images.

7. The system of claim 6, wherein the feature identification module identifies a connected group of pixels to associate with a feature, and sets the intensity values of pixels bounded by the identified pixels to a non-background intensity value.

8. The system of claim 6, wherein the template generation module registers the binary images of the plurality of previously acquired images.

9. A template-based method for analyzing an image, comprising: receiving from a high-content image system (HCIS) an image of a slide loaded in the HCIS; wherein the image includes areas associated with reference marks and areas associated with sample locations; storing a plurality of previously acquired images, wherein each of the plurality of previously acquired images is an image of one of a plurality of slides other than the slide represented in the received; identifying in a binary image of the received image a first area expected to be associated with one of the reference marks; determining a feature that is common to the plurality of slides and represented in each of the plurality of previously acquired images wherein the feature comprises a plurality of features and generating the template includes identifying the plurality of features common to the binary images of the plurality of previously acquired images and setting pixels in the template image associated with the plurality of features to a non-background intensity value and setting pixels of the template image not associated with the identified features to a background intensity value; generating a template image in accordance with the plurality of previously acquired images, wherein the template image identifies a second area thereof that is associated with the feature; aligning the first area of the binary image with the second area of the template image ; calculating an offset between the template image and the binary image in accordance with the alignment of the first area and the second area; and determining the coordinates of pixels of the received image that are associated with a sample location of the slide represented in the received image in accordance with the calculated offset.

10. The method of claim 9, further including operating a position device of the HCIS in accordance with the coordinates, and directing the HCIS to acquire an image of the sample location associated with the coordinates.

11. The method of claim 9, further including developing sub-images of the received image in accordance with coordinates.

12. The method of claim 9, wherein the generated template image is a binary image.

13. The method of claim 9, wherein generating the template image includes associating the second area with the feature only if the feature is also represented in the received image.

14. The method of claim 9, further including developing a binary image associated with each of the plurality of previously acquired images.

15. The method of claim 14, wherein developing the binary image includes identifying a connected group of pixels to associate with the feature, and setting the intensity values of pixels bounded by the identified pixels to a non-background intensity value.

16. The method of claim 14, wherein generating the template includes registering the binary images associated with plurality of previously acquired images.

* * * * *